(12) United States Patent
Lai et al.

(10) Patent No.: US 10,857,770 B2
(45) Date of Patent: Dec. 8, 2020

(54) BUILDING BOARD AND METHOD OF FORMING THE BUILDING BOARD

(71) Applicant: CERTAINTEED GYPSUM, INC., Malvern, PA (US)

(72) Inventors: Choung-Houng Lai, Acton, MA (US); Gerald Boydston, Cody, WY (US); Bryan Wiltzius, Largo, FL (US); Nathan Frailey, Cody, WY (US); Michael J. Lemberger, Dudley, MA (US)

(73) Assignee: CERTAINTEED GYPSUM, INC., Malvern, PA (US)

( * ) Notice: Subject to any disclaimer, the term of this patent is extended or adjusted under 35 U.S.C. 154(b) by 0 days.

(21) Appl. No.: 15/476,786

(22) Filed: Mar. 31, 2017

(65) Prior Publication Data

US 2017/0284093 A1 Oct. 5, 2017

Related U.S. Application Data (60) Provisional application No. 62/316,999, filed on Apr. 1, 2016, provisional application No. 62/339,453, filed on May 20, 2016.

(51) Int. Cl.
*B32B 27/12* (2006.01)
*B32B 5/02* (2006.01)
(Continued)

(52) U.S. Cl.
CPC ............. *B32B 27/12* (2013.01); *B32B 3/266* (2013.01); *B32B 5/022* (2013.01); *B32B 5/024* (2013.01);
(Continued)

(58) Field of Classification Search
CPC .......... B32B 13/00; B32B 13/02; B32B 13/04; B32B 13/12; B32B 13/14; B32B 2607/00;
(Continued)

(56) References Cited

U.S. PATENT DOCUMENTS

| 3,967,016 A | 6/1976 | Schneller et al. |
| 4,106,588 A | 8/1978 | Moore et al. |

(Continued)

FOREIGN PATENT DOCUMENTS

| CN | 101855073 A | * 10/2010 | ............. B32B 13/06 |
| JP | H08300550 A | 11/1996 | |

(Continued)

OTHER PUBLICATIONS

DeMeuse, Mark T.. (2011). Biaxial Stretching of Film—Principles and Applications—1. Fundamentals of Biaxial Stretching and Definitions of Terms. Woodhead Publishing. Retrieved from app.knovel.com/hotlink/pdf/id:kt0094H3A1/biaxial-stretching-film/fundamentals-biaxial (Year: 2011).*

(Continued)

*Primary Examiner* — Maria V Ewald
*Assistant Examiner* — Ethan A. Utt
(74) *Attorney, Agent, or Firm* — Abel Schillinger, LLP; Thomas H. Osborn (57) ABSTRACT

A building board including a cementitious layer between two fiber mats. At least one fiber mat forms with a polymer film a fiber mat/polymer film laminate. The cementitious layer of the building board contains a reactive water-insoluble polymer which improves binding of the fiber mat/polymer film laminate to the cementitious layer. The building board has a low water absorption and a high level surface finish.

18 Claims, 4 Drawing Sheets

(51) Int. Cl.
  *B32B 13/14*   (2006.01)
  *B32B 37/15*   (2006.01)
  *E04C 2/04*    (2006.01)
  *E04C 2/26*    (2006.01)
  *B32B 13/02*   (2006.01)
  *B32B 27/28*   (2006.01)
  *B32B 13/12*   (2006.01)
  *B32B 7/12*    (2006.01)
  *B32B 13/04*   (2006.01)
  *B32B 27/06*   (2006.01)
  *B32B 27/36*   (2006.01)
  *B32B 37/12*   (2006.01)
  *B32B 3/26*    (2006.01)
  *E04C 2/52*    (2006.01)
  *B32B 27/32*   (2006.01)
  *B32B 19/04*   (2006.01)
  *B32B 27/34*   (2006.01)
  *B32B 37/24*   (2006.01)
  *B32B 38/00*   (2006.01)
  *B32B 37/02*   (2006.01)

(52) U.S. Cl.
  CPC .......... *B32B 7/12* (2013.01); *B32B 13/02* (2013.01); *B32B 13/04* (2013.01); *B32B 13/12* (2013.01); *B32B 13/14* (2013.01); *B32B 19/045* (2013.01); *B32B 27/06* (2013.01); *B32B 27/281* (2013.01); *B32B 27/32* (2013.01); *B32B 27/34* (2013.01); *B32B 27/36* (2013.01); *B32B 37/12* (2013.01); *B32B 37/153* (2013.01); *B32B 37/24* (2013.01); *B32B 38/164* (2013.01); *E04C 2/043* (2013.01); *E04C 2/26* (2013.01); *E04C 2/528* (2013.01); *B32B 37/02* (2013.01); *B32B 2250/04* (2013.01); *B32B 2250/05* (2013.01); *B32B 2250/40* (2013.01); *B32B 2255/10* (2013.01); *B32B 2255/26* (2013.01); *B32B 2255/28* (2013.01); *B32B 2260/021* (2013.01); *B32B 2260/044* (2013.01); *B32B 2262/0276* (2013.01); *B32B 2262/10* (2013.01); *B32B 2262/101* (2013.01); *B32B 2262/14* (2013.01); *B32B 2307/50* (2013.01); *B32B 2307/51* (2013.01); *B32B 2307/536* (2013.01); *B32B 2307/54* (2013.01); *B32B 2307/7246* (2013.01); *B32B 2307/732* (2013.01); *B32B 2315/085* (2013.01); *B32B 2315/18* (2013.01); *B32B 2419/00* (2013.01); *B32B 2607/00* (2013.01)

(58) Field of Classification Search
  CPC ......... B32B 2419/00; B32B 7/00; B32B 7/04; B32B 7/12; B32B 7/14; B32B 13/08; B32B 17/00; B32B 17/02; B32B 17/04; B32B 17/06; B32B 17/064; B32B 17/065; B32B 17/067; B32B 27/00; B32B 27/02; B32B 27/04; B32B 27/06; B32B 27/08; B32B 27/10; B32B 27/12; B32B 27/36; B32B 2367/00; B32B 7/02; E04C 2/00; E04C 2/02; E04C 2/04; E04C 2/043; E04C 2/049; E04C 2/10; E04C 2/16; E04C 2/20; E04C 2/24; E04C 2/26; E04C 2/284; E04C 2/296; Y10T 428/31786; Y10T 428/3179; Y10T 428/31797; Y10T 428/31616; Y10T 428/31645; Y10T 428/31649; Y10T 428/31971; Y10T 428/31993; Y10T 428/31996; Y10T 442/10; Y10T 442/102; Y10T 442/133; Y10T 442/145; Y10T 442/164; Y10T 442/171; Y10T 442/172; Y10T 442/176; Y10T 442/178; Y10T 442/179; Y10T 442/183; Y10T 442/184; Y10T 442/191; Y10T 442/198; Y10T 442/30; Y10T 442/3854; Y10T 442/3862; Y10T 442/60; Y10T 442/674; Y10T 442/675; E04B 2103/00; E04B 2103/02; E04B 2103/04; E04B 1/02; E04B 1/12; E04B 1/14; C04B 25/06; C04B 2103/0055
  USPC ....... 428/688, 689, 697, 699–703, 480, 481, 428/483, 426, 430, 441, 442, 532, 537.5, 428/537.7, 212–220, 332, 334–337, 428/339–342, 343, 345–347, 349, 350, 428/352–354, 355 R, 355 EN, 355 AC; 442/1, 2, 20, 27, 38, 42, 43, 45–47, 49, 442/50, 54, 58, 181, 286, 287, 327, 394, 442/395
  See application file for complete search history.

(56) References Cited

U.S. PATENT DOCUMENTS

| | | |
|---|---|---|
| 4,328,652 A | 5/1982 | Naumovich, Jr. |
| 4,811,538 A | 3/1989 | Lehnert et al. |
| 5,316,848 A | 5/1994 | Bartlett et al. |
| 5,565,252 A * | 10/1996 | Finestone ............... B32B 27/10 428/344 |
| 5,871,857 A | 2/1999 | Alhamad |
| 6,054,088 A | 4/2000 | Alhamad |
| 6,334,280 B1 | 1/2002 | Frappart et al. |
| 6,524,679 B2 | 2/2003 | Hauber et al. |
| 6,531,210 B1 | 3/2003 | Englert |
| 6,800,361 B2 | 10/2004 | Bruce et al. |
| 6,925,766 B2 | 8/2005 | Di Pede |
| 6,941,720 B2 | 9/2005 | Deford et al. |
| 6,983,821 B2 | 1/2006 | Putt et al. |
| 7,594,456 B2 | 9/2009 | Hauber et al. |
| 7,763,134 B1 * | 7/2010 | Kumar ................... B32B 13/12 156/39 |
| 7,807,592 B2 | 10/2010 | Bland et al. |
| 7,908,810 B2 | 3/2011 | Payne, Jr. et al. |
| 8,070,895 B2 | 12/2011 | Engbrecht et al. |
| 8,309,211 B2 | 11/2012 | Mehta et al. |
| 8,323,770 B2 | 12/2012 | Mehta et al. |
| 8,353,401 B2 | 1/2013 | Hauber et al. |
| 8,486,516 B2 | 7/2013 | Hauber et al. |
| 8,557,366 B2 | 10/2013 | Harrington, Jr. et al. |
| 8,568,544 B2 | 10/2013 | Engbrecht et al. |
| 8,832,923 B2 | 9/2014 | Hauber et al. |
| 9,068,586 B2 | 6/2015 | Hauber et al. |
| 2002/0151240 A1 | 10/2002 | Smith et al. |
| 2002/0187297 A1* | 12/2002 | Hauber ................... B32B 13/02 428/70 |
| 2004/0142618 A1 | 7/2004 | Porter |
| 2005/0097857 A1 | 5/2005 | Mehta et al. |
| 2005/0130541 A1 | 6/2005 | Shah |
| 2007/0110980 A1 | 5/2007 | Shah |
| 2010/0055431 A1* | 3/2010 | College ................... B32B 13/14 428/411.1 |
| 2010/0178827 A1 | 7/2010 | Thai et al. |
| 2010/0247937 A1* | 9/2010 | Liu .......................... C04B 28/14 428/500 |
| 2010/0316808 A1 | 12/2010 | Hall et al. |
| 2011/0083396 A1 | 4/2011 | Shelton et al. |
| 2011/0165394 A1 | 7/2011 | Hirose et al. |
| 2011/0173910 A1 | 7/2011 | Franklin |
| 2011/0256372 A1 | 10/2011 | Hauber et al. |
| 2011/0257301 A1* | 10/2011 | Stuart .................... C04B 28/14 524/5 |
| 2013/0178126 A1 | 7/2013 | Bennett |
| 2014/0272404 A1 | 9/2014 | Shake et al. |
| 2015/0064488 A1 | 3/2015 | Foster et al. |
| 2015/0197938 A1 | 7/2015 | Boydston et al. |

(56) References Cited

U.S. PATENT DOCUMENTS

FOREIGN PATENT DOCUMENTS

| | | |
|---|---|---|
| JP | H11315595 A | 11/1999 |
| WO | 2014143780 A1 | 9/2014 |

OTHER PUBLICATIONS

Machine translation (Espacenet) of CN 101855073 A. Translated Apr. 2, 2019. (Year: 2019).*
International Search Report for PCT/US2017/025540, dated Aug. 18, 2017, 1 page.
International Search Report for PCT/US2017/025607, dated Aug. 18, 2017, 1 page.
Selke et al., "Polyester," Plastics Packaging: Properties, Processing, Applications, and Regulations, 2016, pp. 130-132, Hanser Publications.

* cited by examiner

BUILDING BOARD AND METHOD OF FORMING THE BUILDING BOARD

CROSS-REFERENCE TO RELATED APPLICATION(S)

This application claims priority under 35 U.S.C. § 119(e) to U.S. Provisional Patent Application No. 62/316,999, entitled "GYPSUM WALL BOARD WITH HIGH WATER RESISTANCE COMPRISING A LAMINATE," by Choung-Houng LAI et al., filed Apr. 1, 2016, and also claims priority under 35 U.S.C. § 119(e) to U.S. Provisional Patent Application No. 62/339,453, entitled "BUILDING BOARD FOR EXTERNAL USE WITH HIGH FASTENER SEALABILITY," by Jeffrey H. PEET et al., filed May 20, 2016, which are assigned to the current assignee hereof and incorporated herein by reference in their entireties.

BACKGROUND

Field of the Invention

The present invention relates to a building board including a cementitious layer comprising a reactive water-insoluble polymer and a method of making the building board.

Description of Related Art

Gypsum board is traditionally manufactured using a continuous process. In the process, a gypsum slurry is first generated in a mechanical mixer by mixing calcium sulfate hemihydrate (also known as calcined gypsum), water, and other agents. These various additives are used in the gypsum slurry as set accelerators (such as ground gypsum, potassium sulphate), set retarders (such as diethylene triamine tetra acetic acid), water reducing agents (such as condensed naphthalene sulphonates), foaming agents (such as lauryl alcohol ether sulphates), liner bonding agents (such as starch), anti-burning agents (such as boric acid), glass fibers for improved physical properties and fire resistance, other agents to improve reaction to fire properties (such as clay), water proofing agents (such as wax or silicones), or other agents. The gypsum slurry is deposited on a paper sheet which has had each edge scored or creased to facilitate the folding of the edges to make a sidewall of height equal to board thickness and a further flap of width about 1 inch wide folded back over the board. An upper continuously advancing paper sheet is then laid over the gypsum slurry and the edges of the upper and lower sheets are pasted to each other using glue at the edges of the top and/or bottom sheet. The paper sheets and gypsum slurry are passed between parallel upper and lower forming plates or rolls in order to generate an integrated and continuous flat strip of unset gypsum sandwiched between the paper sheets that are known as facing or liners.

Gypsum board is generally installed on construction sites and then further processed to obtain a level 4 or level 5 finish. Level 4 and 5 finishes refer to the state the drywall after installation and prior to painting or wall papering. For example at a level 4, all interior drywall surfaces combine to one smooth surface where adjacent boards to not show an gap and screws for hanging drywalls are covered. Level 5 finish includes all of level 4 and generally a skim coat that smoothens the surface of the drywall in preparation for wall painting or wall papering. Additionally, different rooms may require additional processing to render the gypsum adequate for the rooms function. For example, bathrooms or rooms having high moisture require further surface treatment of the drywall to avoid moisture or water damage. Therefore, there is a need for improved gypsum boards.

BRIEF SUMMARY OF THE INVENTION

In a first aspect, a building board comprises a cementitious layer between a first fiber mat and a second fiber mat, the first fiber mat and the second fiber mat being at least partially embedded in the cementitious layer, the first fiber mat having a first surface and a second surface opposite the first surface, and the second fiber mat is closer to the first surface than to the second surface. The building board further comprises a first adhesive layer directly attached to the second surface of the first fiber mat; and a first polymer film attached to an outer surface of the first adhesive layer, wherein the cementitious layer comprises a reactive water-insoluble polymer adapted for binding the first fiber mat and the second fiber mat to the cementitious layer.

In a second aspect, a method of manufacturing a building board comprises preparing a laminate comprising a polymer film attached by an adhesive layer to a first fiber mat, the laminate comprising a mat surface and a polymer surface; applying a cementitious slurry onto the mat surface of the laminate; applying a second mat onto the cementitious slurry; and drying the cementitious slurry to form a cementitious layer. The manufactured building board has a water absorption of not greater than 10% by weight after 2-hour immersion as per ASTM C 473-13, and the cementitious slurry of the building board comprises a reactive water-insoluble polymer adapted for binding the first mat and the second mat to the cementitious layer.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In the specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any sub combination. Further, references to values stated in ranges include each and every value within that range.

The present disclosure relates to a building board comprising a cementitious layer and a multi-layered structure for protecting the cementitious layer. The building board can have a high level surface finish and low water absorption, making it suitable for interior and exterior use.

Figure 1:
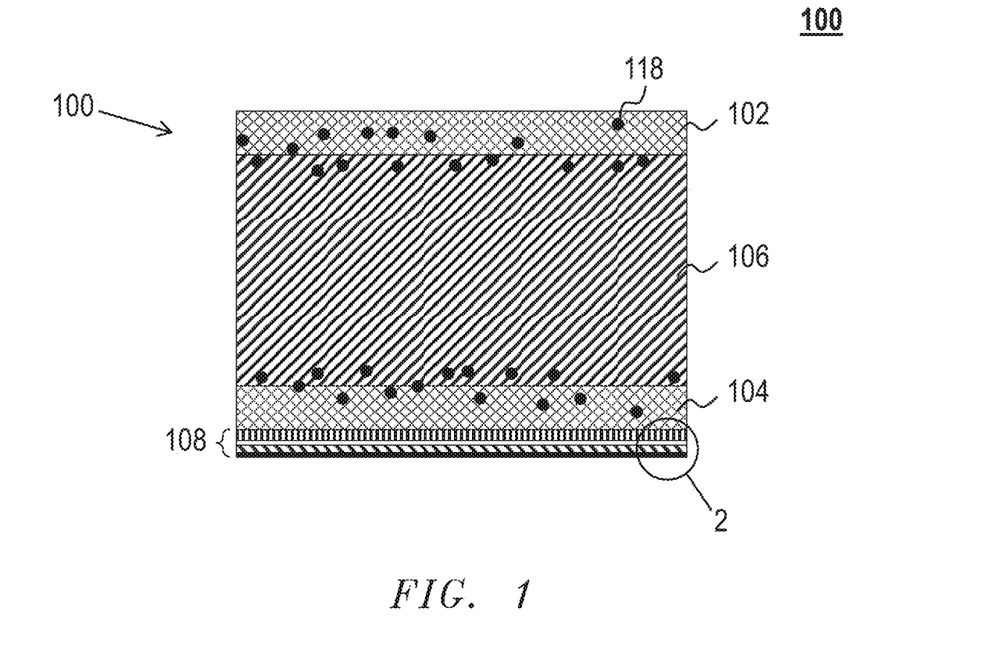
FIG. 1 illustrates an exemplary gypsum board according to a certain embodiment.
Figure 2:
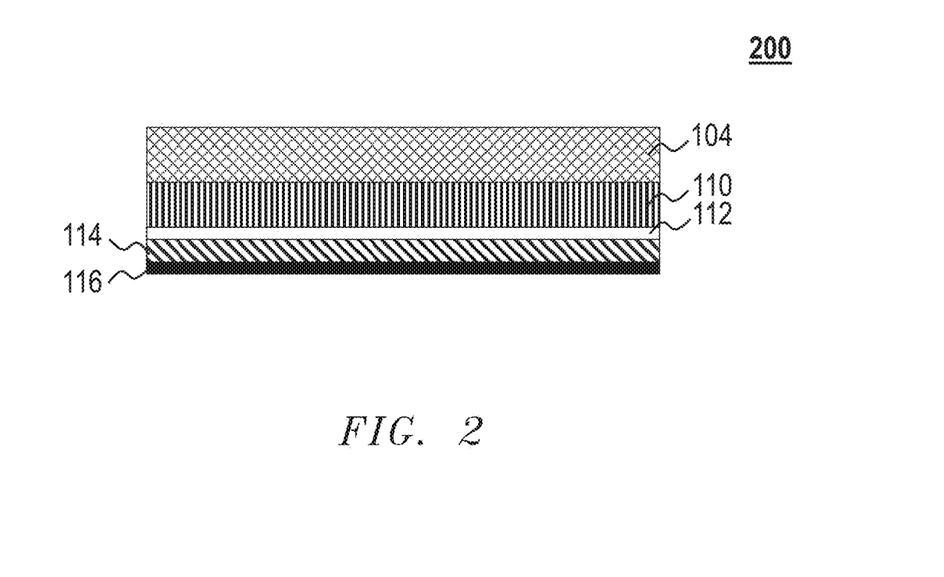
FIG. 2 illustrates laminate which can be applied on a cementitious layer for forming the building board according to a certain embodiment.

As illustrated in the embodiments shown in FIGS. 1 and 2, a building board 100 of the present disclosure can include a cementitious layer 106 between a first mat 102 and a second mat 104. At least one of mat 102 or 104 can be further covered by a polymer film 114 attached to the mat by an adhesive layer 110.

The cementitious layer 106 can be of the type used in gypsum-based structural products commonly known as gypsum wallboard, dry wall, gypsum board, gypsum lathe, gypsum panel and gypsum sheathing.

In embodiments, when layer 106 is a gypsum based layer, layer 106 can be formed by mixing water with powdered anhydrous calcium sulfate ($CaSO_4$) or calcium sulfate hemihydrate ($CaSO_4 \cdot \frac{1}{2}H_2O$), also known as calcined gypsum, and thereafter allowing the mixture to hydrate or set into calcium sulfate dihydrate ($CaSO_4 \cdot 2H_2O$), a relatively hard material. The layer 106 of the product can comprise at least about 60 wt % of set gypsum, such as at least 65 wt %, at least 70 wt %, at least 75 wt %, at least 80 wt %, at least 85 wt %, at least 90 wt %, at least 95 wt %, or at least 98 wt % of set gypsum.

The composition from which the set gypsum core is made can include optional constituents, including, for example, those included in fire-resistant gypsum board and in water-resistant gypsum board. Examples of such constituents include set accelerators, retarders, foaming agents, dispersing agents, water resistant additives and fire resistant additives.

In one embodiment, the gypsum can include a water resistant additive, in an amount such that the core absorbs no more than about 10% by weight, no more than about 8% by weight, no more than about 5% by weight, no more than about 3% by weight, or no more than about 1% by weight of water when tested in accordance with ASTM method C-473-13 with only the edges exposed. In another embodiment, the gypsum can be substantially free of water resistant additives. Those boards can absorb at least 15% by weight, at least 20% by weight, or at least 25% by weight of water when tested in accordance with ASTM method C-473-13 with only the edges exposed.

In one embodiment, a material for use in improving the water-resistant properties of the gypsum layer comprises wax. The amount of wax used can be within the range of about 3 wt % to about 10 wt %, such as about 5 wt % to about 7 wt % based on the total weight of the gypsum layer. In one further embodiment, another material for use in improving the water-resistant properties of the gypsum layer comprises poly(vinyl alcohol). The amount of poly(vinyl alcohol) used can be within the range of about 1 wt % to about 10 wt %, such as about 3 wt % to about 7 wt %. In another embodiment, a particularly preferred material for use in improving the water-resistant properties of the gypsum layer can comprises a mixture of materials, namely, poly(vinyl alcohol) and wax of the aforementioned type. The amounts of poly(vinyl alcohol) and wax used should be at least about 0.05 wt. % and about 2 wt. % respectively. Unless stated otherwise, the term "wt. %" when used herein means weight percent based on the total weight of the ingredients of the composition from which the set gypsum core is made, said ingredients not including additional amounts of water that are added to the gypsum composition for forming an aqueous slurry thereof. A highly preferred water-resistant additive for use in the core of the gypsum-based board is an organopolysiloxane. The amount of the organopolysiloxane should be at least about 0.2 wt %. A preferred amount falls within the range of about 0.3 to about 0.6 wt. %.

The first mat 102 and the second mat 104 can be the same material or different materials. The mats 102 and 104 can include a woven or non-woven material of organic or inorganic fibers. In embodiments, the mats can fiber mats. The material of the fibers could be glass, polyester, polyamide or any other fibers capable withstanding 100° C. or higher temperature without melting. In a particular embodiment, the mats are made of glass fibers. In another particular embodiment, the mats are made of polyester fiber.

The mats 102 and 104 can be embedded completely in the gypsum layer 106. In one embodiment, the mat 102 is embedded at least 85% in the gypsum layer 106, such as at least 90%, at least 95%, at least 98%, at least 99%, or at least 99.9%. The fiber mat can comprise non-woven fibers bound together by a binder, and could comprise woven fibers.

According to a particular embodiment of the present disclosure, the area of the cementitious layer where the mats 102 and 104 are embedded in gypsum core 106 can include a reactive water-insoluble polymer 118 to improve binding between the mats and the gypsum.

In embodiments, the cementitious layer may include cementitious gypsum, Portland cement, magnesium oxide, magnesium phosphate, or any combination thereof. In a particular embodiment, the cementitious layer is a gypsum based layer.

The reactive water-insoluble polymer 118 for the building boards of the present disclosure was selected from the aspect that the boards should have a low water absorption. In one aspect, the reactive polymers 118 may be emulsion polymers. Typically, the reactive polymers suitable for the present disclosure can include polymers with functional groups that allow cross-linking reactions within the polymer itself or with other components having functional groups contained in the cementitious layer or mat components having functional groups, and can bind the mats 102 and 104 stronger to the cementitious layer 106.

In embodiments, the reactive water-insoluble polymer can include a vinyl acetate ethylene copolymer, a styrene acrylic copolymer, an acrylic copolymer, or any combination thereof. The acrylic copolymer can be formed from a monomer selected from (meth)acrylamide, hydroxyl alkyl (meth)acrylate, (meth)acrylic acid, N-(alkoxymethyl)-acrylamide, N-(alkylol)-acrylamide, N-(alkyl)-acrylamide, diacetone (meth) acrylamide, acetoacetoxy alkyl(meth)acrylate or any combination thereof. In one particular embodiment, the monomer can be from N-(methoxymethyl)-acrylamide, N-(methylol)-acrylamide, N-(n-butoxymethyl)-acrylamide, or any combination thereof. In a particular embodiment, the reactive water-insoluble polymer is a self-crosslinking vinyl acetate ethylene. In another particular embodiment, the reactive water-insoluble polymer is a styrene acrylic copolymer.

In yet one further embodiment and not shown in FIG. 1, the reactive water-insoluble polymer 118 can be present throughout the gypsum core, thereby serving as a binder for improved adhesion between gypsum core and the mat material of mats 102 and 104 and for improved tensile strength of the gypsum core.

As further illustrated in FIG. 1, mat 104 can be protected by a multi-layer structure 108 overlying the mat. In one embodiment and not shown in FIG. 1, the multi-layer structure can overly both mats 104 and 102. Moreover, mat 102 only can also be protected by multi-layer structure 108.

In one embodiment, the multi-layer structure 108 can be attached with an adhesive 110 to one of the mats to form a laminate 200, as illustrated in FIG. 2. The adhesive layer 110 can include any adhesive that provides good lamination strength between PET film and glass mat, for example hot melt adhesives, water based liquid adhesives, solvent based adhesives or solvent-less adhesives. Non-limiting examples of adhesives suitable for the adhesive layer 110 can include an acrylic polymer, for example ethyl methyl acrylate, a copolymer of an acrylate, or a vinyl polymer. In one particular embodiment, the adhesive layer 110 can include a copolymer of ethyl methyl acrylate and ethylene vinyl alcohol. In another embodiment, the adhesive can be a hot melt adhesive comprising poly(ethylene-co-methylacrylate) and poly(ethylene-co-vinyl alcohol).

Further referring to FIG. 2, an adhesion promoter 112 can optionally overlie the adhesive layer 110. In one embodiment, the adhesion promoter 112 can be an acrylate polymer that improves the adhesion between polymer film 114 and adhesive layer 110. In another embodiment, the adhesion promoter 112 can include an amorphous polyester.

The polymer film 114 can be polyethylene terephthalate or any of its copolymers, polypropylene or any of its copolymers, polybutylene terephthalate or any of its copolymers, polyamide or any of its copolymers, polyethylene or any of its copolymers, polycarbonate, a poly(acrylonitrile-butadiene-styrene) copolymer, or any combination thereof. In one embodiment, the polymer film 114 consists essentially of polyethylene terephthalate.

The polymer film 114 can be perforated before the gypsum board enters into the oven to allow enhanced removal of water during drying. In embodiments, the polymer film 114 can be a monolayer film or a multilayer construction. In further aspects, the polymer film 114 can have a gloss appearance or matte appearance. In a particular embodiment, the polymer film can comprise at least one polymer with either Tg or Tm that is greater than 100° C.

The polymer film 114 can have a thickness of at least 1 micron, such as at least 2 microns, at least 3 microns, at least 4 microns, at least 5 microns, at least 6 microns, at least 7 microns, or at least 8 microns. In other aspects, the polymer film can have a thickness of not greater than 150 microns, such as not greater than 130 microns, not greater than 100 microns, not greater than 80 microns, not greater than 60 microns, not greater than 50 microns, not greater than 40 microns, not greater than 30 microns, not greater than 25 microns, not greater than 20 microns, not greater than 18 microns, not greater than 16 microns, or not greater than 14 microns. The polymer film can have a thickness between any of the maximum and minimum values noted above, such as from 1 micron to 150 microns, from 5 microns to 100 microns, from 5 microns to 50 microns, from 5 microns to 20 microns, or from 10 microns to 15 microns. In one particular embodiment, the polymer film 114 is about 12 microns thick. The polymer film can provide surface properties to obtain a level 4 or level 5 finish of the building boards of the present disclosure.

Further referring to FIG. 2, a coating 116 can overlie the polymer film 114. In one particular embodiment, coating 116 can be a matte finish coating. The coating 116 can include a polyester copolymer, or an acrylic copolymer. In another aspect, the coating 116 can increase the adhesion between polymer film 114 and a further added paint or joint compound, not shown in FIG. 2.

In one embodiment, a PET film with a matte finish can be used and comprises a paint adhesion primer coating on one side, and an adhesion promoting coating on the other side. The PET film can optionally possess a matte finish inherently without a matte finish adhesion primer coating. In another aspect, an adhesion primer coating can optionally be a matte finish coating that imparts further matte finish to the PET film.

The laminate of the present disclosure can have an exposed smooth surface having an average surface roughness of less than 20 microns, such as less than 15 microns, less than 12 microns, less than 10 microns, or less than 9 microns. The smooth outer surface of the laminate make the building boards easily paintable.

Figure 3:
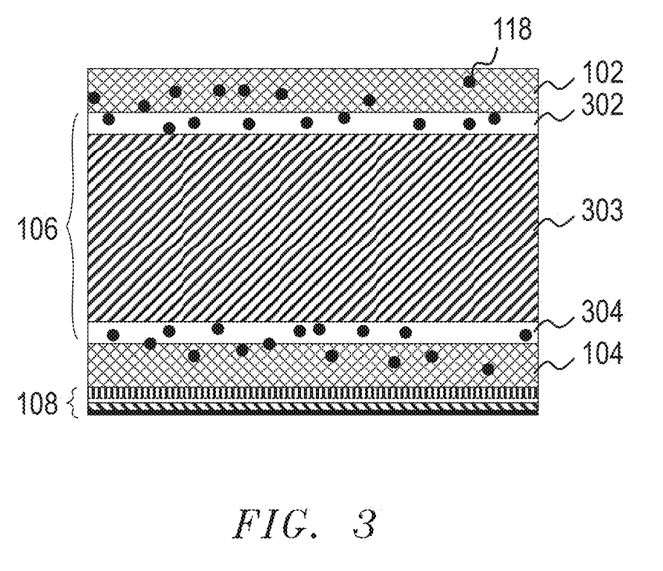
FIG. 3 illustrates another gypsum board according to a certain embodiment.

Referring to FIG. 3, a gypsum board as described in FIG. 1 can include multiple layers of gypsum. As illustrated in FIG. 3, the cementitious layer 106 can have a cementitious core layer 303, a first cementitious layer 302, and a second cementitious layer 304. In a particular embodiment, the first and second cementitious layers 302 and 304 can include the reactive polymer 118 while the cementitious core layer 303 is free of reactive polymer 118.

Figure 4:
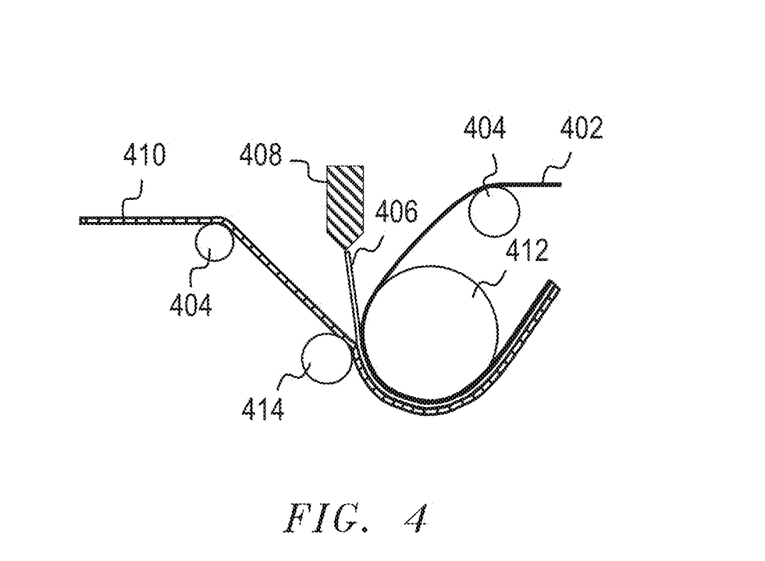
FIG. 4 illustrates a manufacturing process for a laminate according to a certain embodiment.

One embodiment for the manufacturing process for the laminate of the present disclosure is illustrated in FIG. 4. A mat 410 is continuously fed via roll 404 into calendar comprising nip roll 414 and chill roll 412. Adhesive 406 is extruded from die 408 onto the mat 410, and polymer film 402 is fed into the calendar as well.

Figures 5, 6:
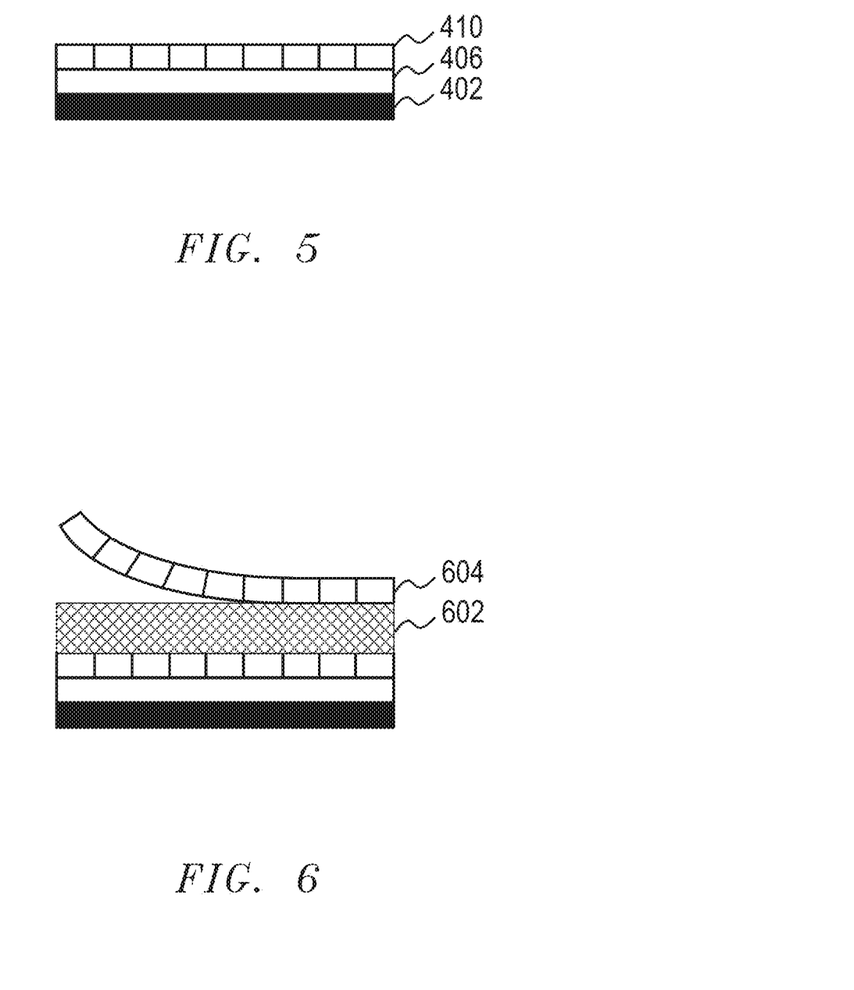
FIG. 5 illustrates a laminate including a fiber mat, adhesive, and polymeric film according to one embodiment.
FIG. 6 illustrates the structure of the building board according to one embodiment and a method step for forming the building board according to one embodiment.

FIG. 5 illustrates the laminate obtained by the above-described process according to one embodiment. The laminate can include a polymer film 402, an adhesive layer 406 and a mat 410. As shown in FIG. 6, a gypsum slurry 602 can be applied onto the mat surface of the laminate followed by adding second mat 604 to form the precursor of the building board. Upon drying, the building board as further described above, e.g., in FIG. 1, can be formed.

In one embodiment, a thickness ratio of the first cementitious layer to the cementitious core layer to the second cementitious layer can be in a range from 1:1:1 to 1:20:1, such as from 1:2:1 to 1:15:1, or from 1:3:1 to 1:10:1.

Figure 7:
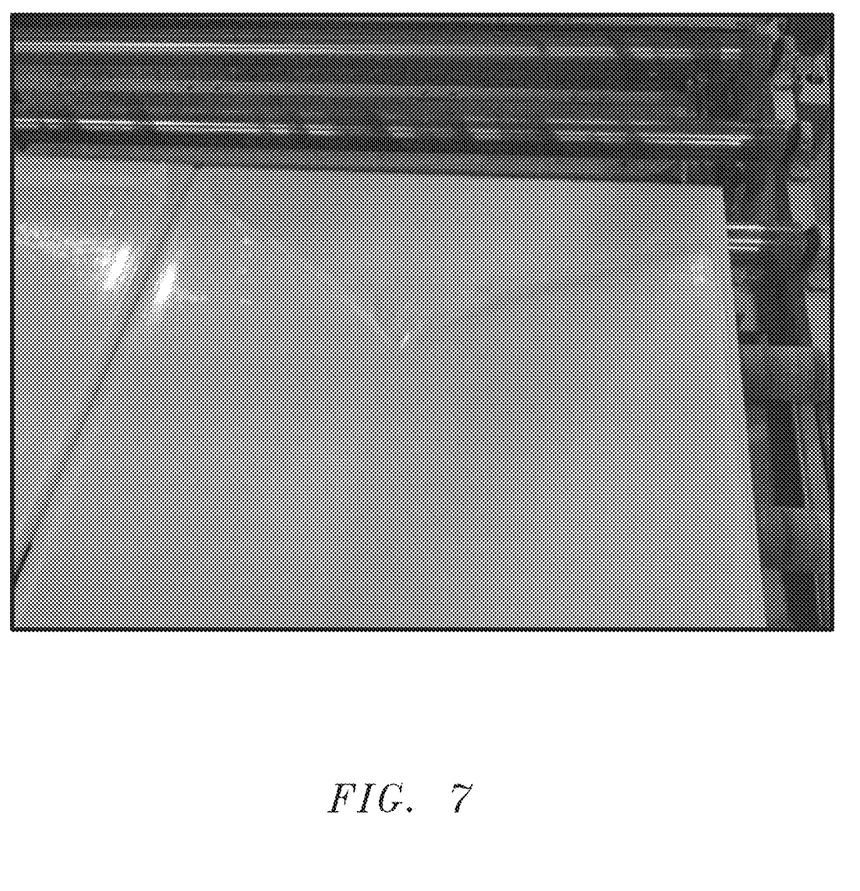
FIG. 7 is an image of a building board subjected to drying under elevated temperatures, wherein the laminate is peeling off.

A laminate produced according to the above-described method may delaminate during drying of the building board under high temperatures in the oven, which is illustrated in FIG. 7. Such delamination could be avoided when a reactive water-insoluble polymer is added to the cementitious layer which can stronger bind the fiber mats to the cementitious layer. In order to maintain a high resistance to water of the building boards, reactive water-insoluble polymers were selected. As further demonstrated in the examples, it was possible to produce low-cost building boards having low water absorption and a level 5 surface finish, making the building boards suitable for use in areas having an elevated exposure to water.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A building board comprising:
a cementitious layer between a first fiber mat and a second fiber mat, the first fiber mat and the second fiber mat being at least partially embedded in the cementitious layer, the first fiber mat having a first surface and a second surface opposite the first surface, and the second fiber mat is closer to the first surface than to the second surface;
a first adhesive layer directly attached to the second surface of the first fiber mat; and a first polymer film attached to an outer surface of the first adhesive layer,
wherein the cementitious layer comprises a reactive water-insoluble polymer adapted for binding the first fiber mat and the second fiber mat to the cementitious layer.

Embodiment 2

The building board according to embodiment 1, wherein the cementitious layer comprises a first cementitious layer, a second cementitious layer, and a core cementitious layer between the first cementitious layer and the second cementitious layer; and wherein the core cementitious layer is essentially free of reactive water-insoluble polymer, and the first cementitious layer and the second cementitious layer include the reactive water-insoluble polymer.

Embodiment 3

The building board according to embodiments 1 or 2, further comprising a second adhesive layer and a second polymer film, wherein:
the second fiber mat has a first surface and a second surface opposite the first surface, the first fiber mat being closer to the first surface of the second fiber mat than the second surface of the second fiber mat, the second adhesive layer attached to the second surface of the second fiber mat, and the second polymer film attached to an outer surface of the second adhesive layer.

Embodiment 4

The building board according to any one of the previous embodiments, wherein the building board has a water absorption of not greater than 10 wt % based on the total weight of the building board after 2-hour immersion as per ASTM C 473-13.

Embodiment 5

The building board according to embodiment 4, wherein the building board has a water absorption of not greater than 8 wt % based on the total weight of the building board.

Embodiment 6

The building board according to any one of the previous embodiments, further comprising a coating layer directly attached to an outer surface of the first polymer film, an outer surface of the second polymer film, or both the outer surface first polymer film and the outer surface of the second polymer film.

Embodiment 7

The building board according to any one of the previous embodiments, wherein an exterior surface of the building board has an average surface roughness of not greater than 20 microns.

Embodiment 8

The building board according to any one of the previous embodiments, wherein the reactive water-insoluble polymer includes an emulsion polymer.

Embodiment 9

The building board according to any one of the previous embodiments, wherein the reactive water-insoluble polymer includes a vinyl acetate ethylene copolymer, a styrene acrylic copolymer, an acrylic copolymer, or any combination thereof.

Embodiment 10

The building board according to any one of the previous embodiments, wherein the reactive water-insoluble polymer is a self-crosslinking polymer.

Embodiment 11

The building board according to embodiment 2, wherein the reactive water insoluble polymer is present in an amount of at least 0.5 wt %, such as at least 1 wt %, at least 2 wt %, at least 3 wt %, or at least 5 wt % based on the total weight of the first cementitious layer or the second cementitious layer.

Embodiment 12

The building board according to any one of the previous embodiments, wherein the cementitious layer includes gypsum, Portland cement, magnesium oxide, magnesium phosphate, or any combination thereof.

Embodiment 13

The building board according to any one of the previous embodiments, wherein the first polymer film, the second polymer film, or the first polymer film and the second polymer film is a melt-extruded film.

Embodiment 14

The building board according to any one of the previous embodiments, wherein the first polymer film, the second polymer film, or the first polymer film and the second polymer film has a thickness of at least 1 micron, such as at least 2 microns, at least 3 microns, at least 4 microns, at least 5 microns, at least 6 microns, at least 7 microns, or at least 8 microns.

Embodiment 15

The building board according to any of the previous embodiments, wherein the first polymer film, the second polymer film, or the first polymer film and the second polymer film has a thickness of not greater than 100 microns, not greater than 80 microns, not greater than 60 microns, not greater than 50 microns, not greater than 40 microns, not greater than 30 microns, not greater than 25 microns, not greater than 20 microns, not greater than 18 microns, not greater than 16 microns, or not greater than 14 microns.

Embodiment 16

The building board according to any one of the previous embodiments, wherein the first polymer film, the second polymer film, or the first polymer film and the second polymer film includes a polyethylene, a polypropylene, a polyamide, a polyamide imide, a polyester, a polycarbonate, a polyether, a polyether ketone, a polyether ether ketone, an acryl copolymer, a butadiene copolymer, a styrene copolymer, or any combination thereof.

Embodiment 17

The building board according to any one of the previous embodiments, wherein the first polymer film, the second polymer film, or the first polymer film and the second polymer film consists essentially of a polyester.

Embodiment 18

The building board according to any of the previous embodiments, wherein the first polymer film, the second polymer film, or the first polymer film and the second polymer film consists essentially of polyethylene terephthalate.

Embodiment 19

The building board according to any one of the previous embodiments, wherein the first polymer film, the second polymer film, or the first polymer film and the second polymer film consists essentially of bi-axially stretched polyethylene terephthalate.

Embodiment 20

The building board according to any one of the previous embodiments, wherein the first fiber mat, the second fiber mat, or both the first fiber mat and the second fiber mat is a glass fiber mat.

Embodiment 21

The building board according to any one of embodiments 1 and 3 to 20, wherein the cementitious layer is a single layer.

Embodiment 22

The building board according to any of embodiments embodiment 2 to 21, wherein a thickness ratio of the first cementitious outer layer to the cementitious core layer to the second cementitious outer layer is in a range from 1:1:1 to 1:20:1, such as from 1:2:1 to 1:15:1, or from 1:3:1 to 1:10:1.

Embodiment 23

The building board according to any one of embodiment 1 and 3 to 20, wherein the cementitious layer has a two layer structure of a cementitious core layer and a first cementitious layer.

Embodiment 24

The building board according to embodiment 23, wherein the first cementitious layer comprises the reactive water-insoluble polymer and the cementitious core layer is essentially free of the reactive water-insoluble polymer.

Embodiment 25

The building board according to embodiments 23 or 24, wherein a thickness ratio of the first cementitious layer to the cementitious core layer is in a range from 1:1 to 1:20, such as from 1:1 to 1:10 or from 1:1 to 1:7.

Embodiment 26

The building board according to any one of the previous embodiments, wherein the first polymer film, the second polymer film, or both the first polymer film and the second polymer film comprises perforations.

Embodiment 27

The building board according to embodiment 26, wherein the perforations comprise openings of at least 20 microns, at least 50 microns, at least 100 microns, at least 200 microns, or at least 500 microns.

Embodiment 28

The building board according to embodiment 26, wherein the perforations comprise openings of not greater than 5 mm, not greater than 3 mm, not greater than 2 mm, not greater than 1.5 mm, or not greater than 1 mm.

Embodiment 29

A method of manufacturing a building board, comprising:
preparing a laminate comprising a polymer film attached by an adhesive layer to a first fiber mat, the laminate comprising a mat surface and a polymer surface;
applying a cementitious slurry onto the mat surface of the laminate;
applying a second mat onto the cementitious slurry; and
drying the cementitious slurry to form a cementitious layer, wherein the building board has a water absorption of not greater than 10% by weight after 2-hour immersion as per ASTM C 473-13, and wherein the cementitious slurry comprises a reactive water-insoluble polymer adapted for binding the first mat and the second mat to the cementitious layer.

Embodiment 30

The method according to embodiments 29, wherein applying the cementitious slurry comprises:
applying a first outer cementitious slurry comprising the reactive water-insoluble polymer to form a first cementitious layer;
applying a core cementitious slurry being essentially free of the water-insoluble polymer to form a core cementitious layer; and
applying a second outer cementitious slurry comprising the reactive water-insoluble polymer to form a second cementitious layer.

Embodiment 31

The method according to embodiments 29 or 30, wherein the reactive water-insoluble polymer is an emulsion polymer.

Embodiment 32

The method according any one of embodiments 29 to 31, wherein the reactive water-insoluble polymer includes a vinyl acetate ethylene copolymer, a styrene acrylic copolymer, an acrylic copolymer, or any combination thereof.

Embodiment 33

The method according any one of embodiments 29 to 32, wherein the reactive water-insoluble polymer is a self-crosslinking polymer.

Embodiment 34

The method according to any one of embodiments 30 to 33, wherein the reactive water insoluble polymer is present in an amount of at least 0.5 wt %, such as 1 wt %, such as at least 2 wt %, at least 3 wt %, or at least 5 wt % based on the total weight of the first cementitious layer or second cementitious layer.

Embodiment 35

The method according to any one of embodiments 30 to 33, wherein the reactive water insoluble polymer is present in an amount of not greater than 15 wt %, such as not greater than 10 wt %, or not greater than 8 wt % based on the total weight of the first cementitious layer or second cementitious layer.

Embodiment 36

The method according any one of embodiments 29 to 35, wherein the cementitious layer includes gypsum, Portland cement, magnesium oxide, magnesium phosphate, or any combination thereof.

Embodiment 37

The method according any one of embodiments 29 to 36, wherein the polymer film is a melt-extruded film.

Embodiment 38

The method according any one of embodiments 29 to 37, wherein polymer film has a thickness of at least 1 micron, such as at least 2 microns, at least 3 microns, at least 4 microns, at least 5 microns, at least 6 microns, at least 7 microns, or at least 8 microns.

Embodiment 39

The method according any one of embodiments 29 to 38, wherein the polymer film has a thickness of not greater than 100 microns, not greater than 80 microns, not greater than 60 microns, not greater than 50 microns, not greater than 40 microns, not greater than 30 microns, not greater than 25 microns, not greater than 20 microns, not greater than 18 microns, not greater than 16 microns, or not greater than 14 microns.

Embodiment 40

The method according any one of embodiments 29 to 39, wherein the polymer film includes a polyethylene, a polypropylene, a polyamide, a polyamide imide, a polyester, a polycarbonate, a polyether, a polyether ketone, a polyether ether ketone, an acryl copolymer, a butadiene copolymer, a styrene copolymer, or any combination thereof.

Embodiment 41

The method according any one of embodiments 29 to 40, wherein the polymer film consists essentially of a polyester.

Embodiment 42

The method according to any one of embodiments 29 to 41, wherein the polymer film includes a polyethylene terephthalate, polypropylene terephthalate, polybutylene terephthalate, polyethylene naphthalate, a polyacrylonitrile-butadiene-styrene, or any combination thereof.

Embodiment 43

The method according any one of embodiments 29 to 42, wherein the polymer film consists essentially of polyethylene terephthalate.

Embodiment 44

The method according any one of embodiments 29 to 43, wherein the polymer film consists essentially of bi-axially stretched polyethylene terephthalate.

Embodiment 45

The method according any one of embodiments 29 to 44, wherein the first fiber mat and the second fiber mat is a glass fiber mat.

Embodiment 46

The method according any one of embodiments 29 to 45, wherein the cementitious layer is a single layer.

Embodiment 47

The method according any one of embodiments 30 to 46, wherein a thickness ratio of the first cementitious layer to the cementitious core layer to the second cementitious outer layer is in a range from 1:1:1 to 1:20:1, such as from 1:2:1 to 1:15:1, or from 1:3:1 to 1:10:1.

Embodiment 48

The method according any one of embodiments 29 to 47, wherein the polymer film comprises perforations.

Embodiment 49

The method according to embodiment 48, wherein the perforations comprise openings of a size of at least 20 microns, at least 50 microns, at least 100 microns, at least 200 microns, or at least 500 microns.

Embodiment 50

The method according to embodiment 48, wherein the perforations comprise openings of a size not greater than 5 mm, not greater than 3 mm, not greater than 2 mm, not greater than 1.5 mm, or not greater than 1 mm.

EXAMPLES

The following non-limiting examples illustrate the present invention.

Example 1

A variety of five different polymer film/glass fiber mat laminates were prepared using a polyethylene terephthalate (PET) film having a thickness of 12 microns. All PET films were coated on one side with a matte finish and on the other side with a hot melt adhesive (20 g/m² to 60 g/m²) and attached to a 0.8 mm thick glass fiber mat. Table 1 provides a summary of the five different polymer film/glass fiber mats. Three hot-melt adhesives were selected under the criteria that a peel strength of the polymer film from the fiber-mat was at least 80 g/inch (30.8 N/m). Hot melt adhesive 1 had a hydroxyl functionality of EVAL (polyethylene-vinyl alcohol copolymer) and hot melt adhesive 2 had hydroxyl functionality in EVAL combined with an epoxide functionality in Epon (a bisphenol-A epoxy oligomer), and adhesive 3 was a polyurethane-based adhesive.

TABLE 1

| Sample | Polymer film | Corona treatment | Matte finish | Adhesive |
|---|---|---|---|---|
| S1 | PET (SP71C from SKC Inc) | Yes | Michem Flex M1203 (Michelman Inc.) | 1 |
| S2 | PET Mylar 813 (Dupont) | Yes | Michem Flex M1203 (Michelman Inc.) | 1 |
| S3 | PET (SP71C from SKC Inc) | Yes | QN641 (Toray) | 1 |
| S4 | PET (SP71C from SKC Inc) | No | QN641 (Toray) | 2 |
| S5 | PET (SP71C from SKC Inc) | Yes | Michem Flex M1203 (Michelman Inc.) | 3 |

Example 2

Building boards were prepared using the PET/glass fiber mat laminates S1 to S5 manufactured in Example 1.

On the exposed glass fiber mat of the laminates of Example 1, a first gypsum slurry was applied including 5 wt % of Dur-O-Set Elite 22 (a vinyl acetate ethylene from Celanese) as reactive water insoluble polymer. The first applied gypsum slurry had a thickness of about 1.5 mm. Thereafter, a second gypsum slurry not containing Dur-O-Set Elite 22 was applied on top of the first gypsum slurry with a thickness of 15 mm, followed by application of a third gypsum slurry layer with a thickness of 1.5 mm, which was the same as the first gypsum slurry layer (including Dur-O-Set Elite 22).

On top of the third gypsum slurry was applied a second glass fiber mat, which was of the same type as the first glass fiber mat in the laminate. The glass mat/polymer laminate was perforated as the multilayer construction was moved along a production line. Subsequently, the multilayer construction was dried in an oven under air flow at temperatures up to 260° C. to remove excess water and to obtain a building board.

During heat treatment in the oven, the PET/glass fiber mat laminates did not delaminate and all boards met the process requirements. In contrast, boards manufactured not using a reactive non-water soluble polymer did not pass process requirements and the laminate was peeled of during heat treatment.

Example 3

Building boards were prepared with laminate S3 of Example 1 according to the same procedure as in Example 2, except that as reactive non-water soluble polymer was used Dur-O-Set 909 (a self-crosslinking vinyl acetate ethylene from Celanese).

During heat treatment in the oven, the PET/glass fiber mat laminate did not delaminate and the board met the process requirements. In contrast, boards manufactured not using a reactive non-water soluble polymer did not pass process requirements, and the laminate was peeled of during heat treatment.

Example 4

Building boards were prepared with laminate S3 of Example 1 according to the same procedure as in Example 2, except that as reactive non-water soluble polymer was used Dur-O-Set Ultra (a self-crosslinking vinyl acetate ethylene from Celanese).

During heat treatment in the oven, the PET/glass fiber mat laminate did not delaminate and the boards met the process requirements. In contrast, boards manufactured not using a reactive non-water soluble polymer did not pass process requirements, and the laminate was peeled of during heat treatment.

Example 5

Building boards were made with laminate S3 of Example 1 according to the same procedure as in Example 2, except that as reactive non-water soluble polymer was used Dur-O-Set Ultra (a self-crosslinking vinyl acetate ethylene from Celanese).

During heat treatment in the oven, the PET/glass fiber mat laminates did not delaminate and the boards met the process requirements. In contrast, boards manufactured not using a reactive non-water soluble polymer did not pass process requirements, and the laminate was peeled of during heat treatment.

Example 6

Building boards were prepared with all laminate samples S1 to S5 of Example 1 according to the same procedure as in Example 2, except that as reactive non-water soluble polymer was used Rhoplex AC-1034 (a styrene acrylic copolymer from Dow).

During heat treatment in the oven, the PET/glass fiber mat laminates did not delaminate and the boards met the process requirements. In contrast, boards manufactured not using a reactive non-water soluble polymer did not pass process requirements, and the laminate was peeled of during heat treatment.

Example 7

Building boards were prepared with laminate S3 of Example 1 according to the same procedure as in Example 2, except that as reactive non-water soluble polymer was used X-Link 2833 (a self-crosslinking vinyl acetate acrylic copolymer from Celanese).

During heat treatment of the boards in the oven, the PET/glass fiber mat laminate did not delaminate and met the process requirements. In contrast, boards manufactured not using a reactive non-water soluble polymer did not pass process requirements, and the laminate was peeled of during heat treatment.

Example 8

Measurement of Surface Roughness

The surface roughness of the produced building boards was measured with a Nanovea ST400 profilometer. Root-mean-square was measured on randomly picked two locations of 1 inch×1 inch size on the front surface of the board, and an average of two measurements calculated.

The surface roughness was measured on the PET surface of the PET/glass-fiber laminate.

Table 2 discloses the average surface roughness of the surface that are exposed to the interior of the gypsum boards according to Example 6, Comparative Example, and two conventional gypsum board from other commercial providers.

TABLE 2

| Gypsum Boards | Average Surface Roughness [microns] |
|---|---|
| Example 2 | 16 |
| Comparative Example 2 (paper surface) | 7 |
| Commercial board 1 | 26 |
| Commercial board 2 | 46 |

As can be seen in Table 1, the boards according to the present disclosure have an average surface roughness that can be mirrored with a paper faced board.

Example 9

Measurement of Water Absorption

The water absorption of the building boards according to the present disclosure, using as reactive polymers Dur-O-Set Elite 22 (from Celanse), X-Link 2833 (from Celanese), Rhoplex AC1034 (from Dow) and was compared with the water absorption of a standard paper faced interior gypsum board (Pro Rock Standard Gypsum Board).

The water absorption testing was conducted by measuring the weight gain after 2 hours water immersion at room temperature according to ASTM C 473-13.

As can be seen in Table 3, all tested building boards according to the present disclosure substantially resisted the water uptake and had water absorption values below 8%.

TABLE 3

| Gypsum Board with reactive polymer | Weight Gain after 2 hours water immersion [wt %] |
|---|---|
| Gypsum board with Dur-O-Set Elite 22 (Example 2) | 7.9 |
| Gypsum board with Rhoplex AC1034 (Example 6) | 4.5 |
| Gypsum board with X-Link 2833 (Example 8) | 6.3 |
| Standard paper faced interior gypsum board - no reactive polymer | 53 |

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A building board comprising:
a cementitious layer between a first fiber mat and a second fiber mat, the first fiber mat and the second fiber mat being at least partially embedded in the cementitious layer, the first fiber mat having a first surface and a second surface opposite the first surface, and the second fiber mat is closer to the first surface than to the second surface;
a first adhesive layer directly attached to the second surface of the first fiber mat; and
a first polymer film attached to an outer surface of the first adhesive layer, the first polymer film being a bi-axially stretched polyethylene terephthalate film having a thickness of at least 5 microns and not greater than 100 microns,
wherein
the cementitious layer comprises a reactive water-insoluble polymer adapted for binding the first fiber mat and the second fiber mat to the cementitious layer, the reactive water-insoluble polymer including a vinyl acetate ethylene copolymer, a styrene acrylic copolymer, an acrylic copolymer, or any combination thereof;

the cementitious layer comprises a first cementitious layer, a second cementitious layer, and a core cementitious layer between the first cementitious layer and the second cementitious layer;

the core cementitious layer is essentially free of reactive water-insoluble polymer, and the first cementitious layer and the second cementitious layer include the reactive water-insoluble polymer; and a peel strength of the first polymer film from the first fiber mat is at least 30.8 N/m.

2. The building board according to claim 1, further comprising a second adhesive layer and a second polymer film, wherein: the second fiber mat has a first surface and a second surface opposite the first surface, the first fiber mat being closer to the first surface of the second fiber mat than the second surface of the second fiber mat, the second adhesive layer attached to the second surface of the second fiber mat, and the second polymer film attached to an outer surface of the second adhesive layer.

3. The building board according to claim 1, wherein the building board has a water absorption of not greater than 10 wt % based on the total weight of the building board after 2-hour immersion as per ASTM C 473-13.

4. The building board according to claim 1, further comprising a coating layer directly attached to an outer surface of the first polymer film.

5. The building board according to claim 1, wherein an exterior surface of the building board has an average surface roughness of not greater than 20 microns.

6. The building board according to claim 1, wherein the reactive water-insoluble polymer includes an emulsion polymer.

7. The building board according to claim 1, wherein the reactive water-insoluble polymer includes an acrylic copolymer.

8. The building board according to claim 1, wherein the reactive water insoluble polymer is present in an amount of at least 0.5 wt % and not greater than 8 wt % based on the total weight of the first cementitious layer and the second cementitious layer.

9. The building board according to claim 1, wherein the cementitious layer includes gypsum, Portland cement, magnesium oxide, magnesium phosphate, or any combination thereof.

10. The building board according to claim 1, wherein a thickness ratio of the first cementitious layer to the cementitious core layer to the second cementitious layer is in a range from 1:1:1 to 1:20:1.

11. The building board according to claim 1, wherein at least 85% of the first fiber mat and at least 85% of the second fiber mat are embedded in the cementitious layer.

12. The building board according to claim 11, wherein the first fiber mat and the second fiber mat are completely embedded in the cementitious layer.

13. A method of manufacturing a building board, comprising:

preparing a laminate, the laminate comprising a bi-axially stretched polyethylene terephthalate film attached by an adhesive layer to a first fiber mat, the first fiber mat having a first surface and a second surface opposite the first surface, the adhesive layer being directly attached to the second surface of the first fiber mat;

applying a cementitious slurry onto the first surface of the first fiber mat of the laminate;

applying a second fiber mat onto the cementitious slurry; and drying the cementitious slurry to form a cementitious layer, wherein the building board has a water absorption of not greater than 10% by weight after 2-hour immersion as per ASTM C 473-13, and wherein the cementitious slurry comprises a reactive water-insoluble polymer adapted for binding the first mat and the second mat to the cementitious layer, the reactive water-insoluble polymer including a vinyl acetate ethylene copolymer, a styrene acrylic copolymer, an acrylic copolymer, or any combination thereof, and wherein the cementitious layer comprises a first cementitious layer, a second cementitious layer, and a core cementitious layer between the first cementitious layer and the second cementitious layer; and wherein the core cementitious layer is essentially free of reactive water-insoluble polymer, and the first cementitious layer and the second cementitious layer include the reactive water-insoluble polymer, and wherein a peel strength of the bi-axially stretched polyethylene terephthalate film from the first fiber mat is at least 30.8 N/m.

14. The method according to claim 13, wherein applying the cementitious slurry comprises:

applying a first outer cementitious slurry comprising the reactive water-insoluble polymer to form a first cementitious layer;

applying a core cementitious slurry being essentially free of the water-insoluble polymer to form a core cementitious layer; and applying a second outer cementitious slurry comprising the reactive water-insoluble polymer to form a second cementitious layer.

15. The method according to claim 13, wherein a thickness ratio of the first cementitious layer to the cementitious core layer to the second cementitious outer layer is in a range from 1:1:1 to 1:20:1.

16. The method according to claim 13, wherein the reactive water-insoluble polymer is a self-crosslinking emulsion polymer.

17. The method according to claim 13, wherein the reactive water-insoluble polymer includes an acrylic copolymer.

18. The method according to claim 13, wherein the cementitious layer includes gypsum, Portland cement, magnesium oxide, magnesium phosphate, or any combination thereof.

* * * * *